(12) United States Patent
Moine et al.

(10) Patent No.: US 11,623,317 B2
(45) Date of Patent: Apr. 11, 2023

(54) SET INCLUDING A SEMI-FINISHED OPTICAL ELEMENT AND A BLOCKING DEVICE; AND A METHOD FOR PROVIDING SUCH A SET

(71) Applicant: ESSILOR INTERNATIONAL, Charenton-le-Pont (FR)

(72) Inventors: Jérome Moine, Charenton-le-Pont (FR); Luc Martin, Charenton-le-Pont (FR); Sébastien Pinault, Charenton-le-Pont (FR); Xavier Bultez, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 855 days.

(21) Appl. No.: 16/484,393

(22) PCT Filed: Feb. 7, 2018

(86) PCT No.: PCT/EP2018/053025
§ 371 (c)(1),
(2) Date: Aug. 7, 2019

(87) PCT Pub. No.: WO2018/146125
PCT Pub. Date: Aug. 16, 2018

(65) Prior Publication Data
US 2021/0138603 A1 May 13, 2021

(30) Foreign Application Priority Data
Feb. 7, 2017 (EP) .................................. 17305144

(51) Int. Cl.
*B24B 13/005* (2006.01)
*B29D 11/00* (2006.01)

(52) U.S. Cl.
CPC ...... *B24B 13/0052* (2013.01); *B29D 11/0048* (2013.01); *B29D 11/00942* (2013.01)

(58) Field of Classification Search
CPC .......... B24B 13/0052; B29D 11/00942; B29D 11/0048
See application file for complete search history.

(56) References Cited

U.S. PATENT DOCUMENTS

| 4,158,273 A | 6/1979 | Olsen et al. |
| 2008/0026679 A1* | 1/2008 | Siders ..................... B24B 13/06 451/5 |

(Continued)

FOREIGN PATENT DOCUMENTS

| EP | 2255925 A1 | 12/2010 |
| WO | 2008/022978 A1 | 2/2008 |

OTHER PUBLICATIONS

International Search Report, dated Apr. 25, 2018, from corresponding PCT application No. PCT/EP2018/053025.

*Primary Examiner* — Mathieu D Vargot
(74) *Attorney, Agent, or Firm* — Nixon & Vanderhye

(57) ABSTRACT

A set includes a molding device having a molding face having the same shape as a contact face of the blocking device. A removable overlay of rigid material has a first face attached to a first face of the semi-finished optical element and a second face opposite to the first face having the same shape as the contact face of the blocking device, the set being configured for having a first subset configuration in which the second face of the removable overlay is in molding contact with the molding face of the molding device, then a second subset configuration in which the second face of the removable overlay is free and then a third (Continued)

subset configuration in which the second face of the removable overlay is retained in contact with the contact face of the blocking device.

20 Claims, 6 Drawing Sheets

(56) References Cited

U.S. PATENT DOCUMENTS

| | | |
|---|---|---|
| 2008/0051017 A1* | 2/2008 | Jiang ........................ B24B 9/146 451/384 |
| 2009/0079934 A1 | 3/2009 | Su et al. |
| 2012/0074602 A1* | 3/2012 | Felten ................. B24B 13/0052 264/2.5 |

* cited by examiner

SET INCLUDING A SEMI-FINISHED OPTICAL ELEMENT AND A BLOCKING DEVICE; AND A METHOD FOR PROVIDING SUCH A SET

FIELD OF THE INVENTION

The invention relates to the blocking of semi-finished optical elements.

BACKGROUND ART

It is known that a semi-finished optical element, for instance a semi-finished ophthalmic lens, has a finished face and opposite to the finished face an unfinished face which is to be surfaced so as to obtain an optical element having the desired optical properties.

It is also known to surface the unfinished face with a machine, sometimes called a generator, configured for holding the semi-finished optical element via a blocking device previously attached to the finished face of the semi-finished optical element.

The following techniques are known for attaching the blocking device to the finished face of the semi-finished optical element:
  alloy blocking: a low temperature melted alloy is injected between the finished face of the semi-finished optical element (covered by a sticky plastic film) and an aluminum rigid insert; once the alloy is cold, it sticks to the plastic film;
  vacuum blocking: an insert having a spherical end face and cavities managed behind the end face is covered by a rubber thin layer, a spherical convex finished face of a semi-finished optical element having the same curvature radius is applied and pressed on the rubber thin layer while sucking out the air inside the insert cavities so that a holding effect results from the vacuum and rubber friction force;
  alloy free UV polymerizable glue: a semi-liquid glue is injected between a concave end face of a plastic transparent insert and the finished face of a semi-finished optical element; then, the glue is polymerized by UV light through the transparent insert to become harder; and
  alloy free re-usable polymer: a semi-liquid polymer glue is melted and injected between a concave end face of an aluminum insert (covered by a sticky film) and the finished face (covered by a sticky film) of the semi-finished optical element; then, the glue is polymerized by cooling to become harder.

SUMMARY OF THE INVENTION

The invention is directed to a blocking technique with better performance while remaining simple, convenient and economic.

The invention accordingly provides a set including a semi-finished optical element and a blocking device, said semi-finished optical element having a first face to which the blocking device is to be attached and having opposite to the first face a second face to be surfaced in a machine configured for holding the semi-finished optical element via the blocking device, characterized in that:
  the blocking device has a contact face having a predetermined axisymmetric shape and is configured for enabling a retaining effect at the contact face so as to hold an element having against the contact face a surface of the same shape as the contact face;
  the set further comprises a molding device having a molding face having the same shape as the contact face of the blocking device; and
  a removable overlay of rigid material has a first face attached to the first face of the semi-finished optical element and a second face opposite to the first face having the same shape as the contact face of the blocking device, said set being configured for having a first subset configuration in which the second face of the removable overlay is in molding contact with the molding face of the molding device, then a second subset configuration in which the second face of the removable overlay is free and then a third subset configuration in which the second face of the removable overlay is retained in contact with the contact face of the blocking device.

Thus, in the third subset configuration the blocking device holds the semi-finished optical element with the contact face of the blocking device directly attached to the second face of the removable overlay and consequently attached to the first face of the semi-finished optical element via the removable overlay.

The second face of the semi-finished optical element can thus be surfaced by the machine.

Once the surfacing operation is completed, the second face of the removable overlay is released from the contact face of the blocking device, for instance by breaking the vacuum between these faces if the retaining effect is vacuum-based (in other words if the blocking device is a vacuum blocking device), and the removable overlay is removed.

The set according to the invention is of course able to provide the required alignment between the blocking device and the semi-finished optical element, provided that the second face of the removable overlay is aligned with the semi-finished optical element and that in the third subset configuration the contact face of the blocking device is aligned with the second face of the removable overlay.

The set according to the invention offers the advantage of increasing the possibilities of use of blocking devices normally requiring that the first face of the semi-finished optical element has the same shape as the shape of the contact face of the blocking device, for instance vacuum blocking devices.

Indeed, since the removable overlay has its second face which has the same shape as the contact face of the blocking device, the first face of the semi-finished optical element can have a shape different from the shape of the contact face of the blocking device.

The set according to the invention is also advantageous for other types of blocking devices, for instance blocking devices using glue. Indeed, since the removable overlay has its second face which has the same shape as the contact face of the blocking device, the layer of glue has everywhere the same thickness and thus can be very efficient, even when the first face of the semi-finished optical element has a shape different from the shape of the contact face of the blocking device.

The set according to the invention offers the advantage that the supporting stiffness useful for preventing deformation of the optical element during the surfacing operation can be adjusted to the instant needs, instead of being dimensioned in the same manner for all the semi-finished optical elements.

Indeed, in the third subset configuration, the removable overlay provides stiffness support to the optical element together with the blocking device. Since only the second surface of the removable overlay is involved in the retaining effect with the blocking device, the other portions of the removable overlay can be dimensioned according the degree of supporting stiffness needed.

For instance, if the semi-finished optical element is relatively thin the thickness of the removable overlay can be relatively important; and conversely if the optical element is relatively thick, the thickness of the removable overlay can be relatively small.

For instance also, if the optical element is going to be a spectacle glass with relatively large dimensions, it is useful to provide supporting stiffness up to the edge of the semi-finished optical element so as to limit deformations detrimental to the surfacing accuracy near the edge since the area near the edge will be included in the spectacle glass. The removable overlay could therefore have a diameter which is the same or close to the same as the diameter of the semi-finished optical element. Conversely, if the optical element is going to be a spectacle glass with relatively small dimensions, the diameter of the removable overlay can be smaller than the diameter of the semi-finished optical element.

Thus, the quantity of material used for the removable overlay can be tailored to the instant need and waste of material can be avoided. According to advantageous features, in particular because of the good performance they offer:

- the second face of the removable overlay is aligned with a reference mark of the semi-finished optical element;
- in the third subset configuration, the contact face of the blocking device is aligned with the second face of the removable overlay;
- the predetermined axisymmetric shape of the contact face is a spherical shape;
- the removable overlay and the blocking device include form fit indexing members;
- form fit indexing members include two male members and two female members;
- an adhesive film is interposed between the semi-finished optical element and the removable overlay, said adhesive film having an adhesive face attached to the first face of the semi-finished optical element;
- said retaining effect is vacuum-based and the blocking device includes a rigid part and a flexible non-skid wafer covering said rigid part on one side and forming said contact face on the side opposite to said one side; and/or
- the semi-finished optical element is a semi-finished ophthalmic lens.

The invention is also directed to a method for providing a set including the following steps:

- providing a blocking device having a contact face having a predetermined axisymmetric shape and configured for enabling a retaining effect at the contact face so as to hold an element having against the contact face a surface of the same shape as the contact face;
- providing a semi-finished optical element having a first face to which the blocking device is to be attached and having opposite to the first face a second face to be surfaced in a machine configured for holding the semi-finished optical element via the blocking device;
- providing a molding device having a molding face having the same shape as the contact face of the blocking device;
- casting a removable overlay of rigid material between the first face of said semi-finished optical element and the molding face of said molding device, said removable overlay thus having a first face attached to the first face of the semi-finished optical element and a second face opposite to the first face having the same shape as the contact face of the blocking device; and
- removing said molding device while leaving said removable overlay attached to the first face of the semi-finished optical element.

According to advantageous features, in particular because of the good performance they offer:

- said removable overlay is made of a material having a conformable state above ambient temperature and a rigid state at ambient temperature, and said method includes the step of warming said material to reach said conformable state and casting said removable overlay in said conformable state and leaving said removable overlay to cool so as to become rigid;
- said material is a thermoplastic material;
- the method further includes:
  providing a first equipment having a first reference frame,
  for carrying out the step of casting, positioning said semi-finished optical element and said molding device each with respect to said first reference frame so that said molding face is aligned with a reference mark of the semi-finished optical element;
  after the step of casting, removing the molding device and positioning said blocking device with respect to said first reference frame so that said contact face of said blocking device is in contact with said second face of said removable overlay and is aligned with said reference mark of the semi-finished optical element whereby said contact face of said blocking device is aligned with said second face of said removable overlay; and
  enabling said retaining effect at said contact face of said blocking device;
- the method further includes:
  providing a first equipment having a first reference frame,
  providing a second equipment having a second reference frame, distinct from said first equipment,
  for carrying out the casting step, positioning said semi-finished optical element and said molding device each with respect to said first reference frame so that said molding face is aligned with a reference mark of the semi-finished optical element; and
  after the casting step, positioning said semi-finished optical element overlaid with said removable overlay and said blocking device each with respect to said second reference frame so that said contact face of said blocking device is in contact with said second face of said removable overlay and is aligned with said reference mark of the semi-finished optical element whereby said contact face of said blocking device is aligned with said second face of said removable overlay; and
  enabling said retaining effect at said contact face of said blocking device; and/or
- the molding device and the first equipment include form fit indexing members for positioning said molding device with respect to said first reference frame, and said first equipment includes a positioning system configured for positioning said semi-finished optical element with respect to said first reference frame, said positioning system including a camera configured for determining a current position of said semi-finished optical element.

BRIEF DESCRIPTION OF THE DRAWINGS

The description of the invention continues now with a detailed description of example embodiments given hereinafter by way of non-limiting illustration and with reference to the appended drawings. In the drawings.

DETAILED DESCRIPTION OF PREFERRED EMBODIMENTS

Figure 1:
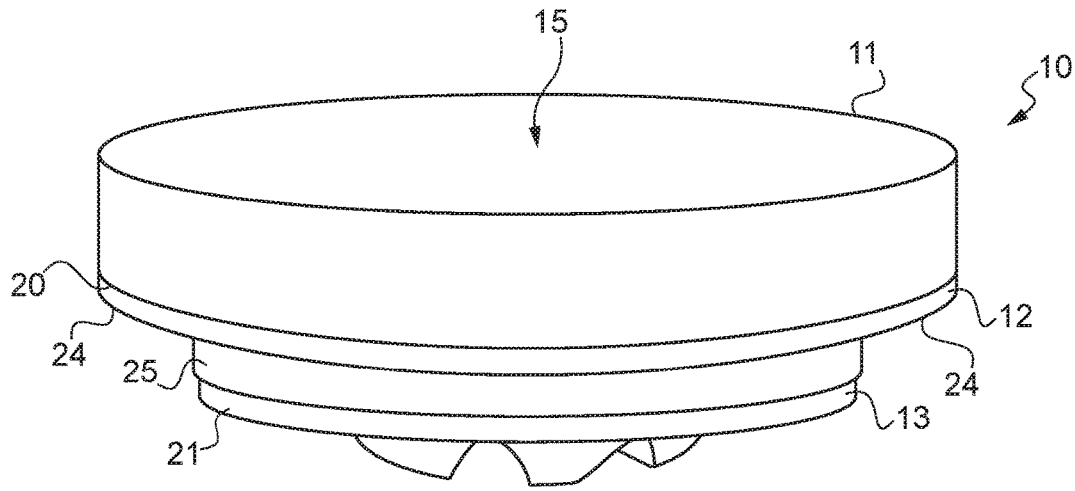
FIG. 1 is a perspective view of a subset of a set according to the invention, comprising an optical element provided with a removable overlay and a blocking device coupled to the optical element via the removable overlay.
Figure 2:
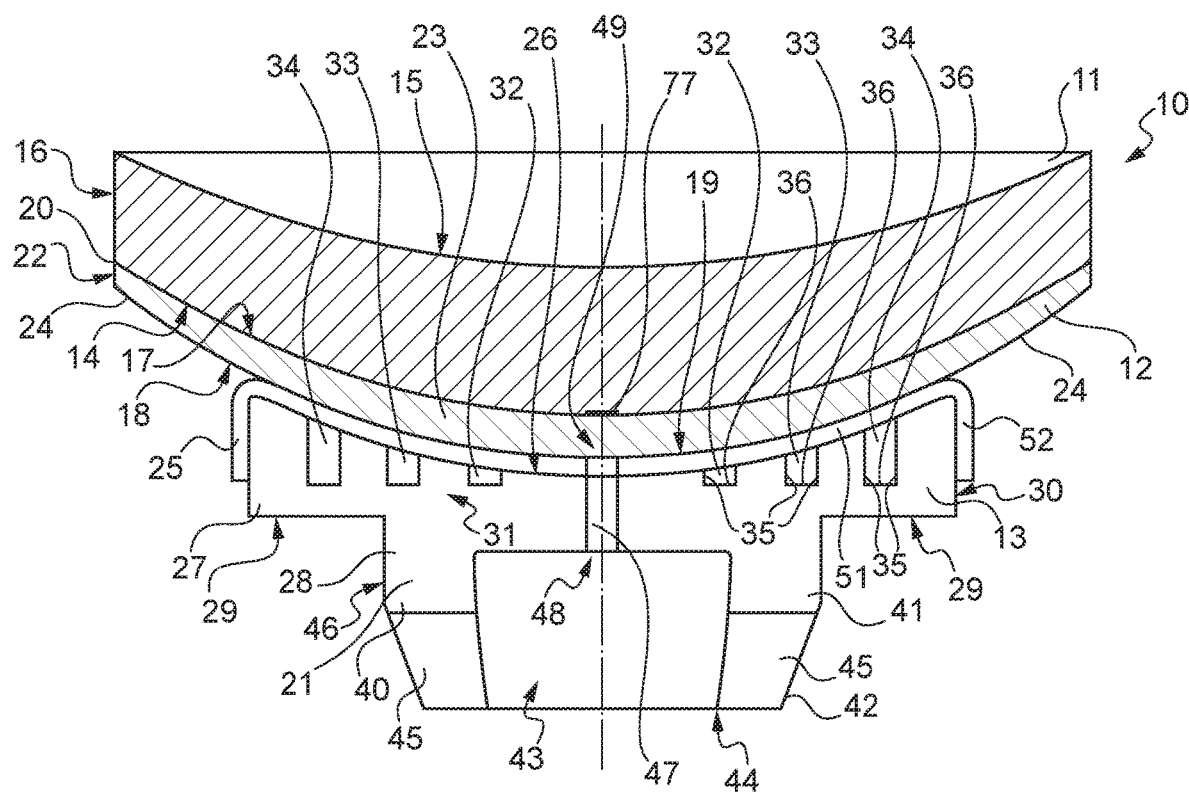
FIG. 2 is a sectional view of the subset of FIG. 1.

The subset 10 shown on FIGS. 1 and 2 includes a semi-finished optical element 11, a removable overlay 12 of rigid material overlaying an optical face of the semi-finished optical element 11 and a blocking device 13 coupled to the semi-finished optical element 11 through the removable overlay 12 which is interposed between the blocking device 13 and the semi-finished optical element 11.

The semi-finished optical element 11 is here a semi-finished ophthalmic lens and has a first optical face 14, a second optical face 15, opposite to the first optical face 14, and a lateral surface 16 extending from one to the other of the first optical face 14 and second optical face 15.

The semi-finished optical element 11 is generally circular in shape, the first face 14 is convex and the second face 15 is concave.

The second face 15 is to be surfaced in a surfacing apparatus (not illustrated) configured for holding the semi-finished optical element 11 via the blocking device 13.

On FIGS. 1 and 2, the subset 10 is shown in a condition ready to be fitted to the surfacing apparatus.

As is well known, the second face is surfaced in the surfacing apparatus for adjusting the optical properties of the element 11, here for adjusting the ophthalmic properties of the ophthalmic lens to the prescription of the user.

The semi-finished optical element 11 is provided with at least one reference mark 77 (FIG. 2), which is printed with ink or engraved on an optical face of the optical element 11, here the first face 14, and is configured to be detected by a positioning system of an equipment configured to determine a current position of the optical element 11 with respect to a reference frame of the equipment. This is referred to in more details below.

The removable overlay 12 is generally circular in shape and has a first face 17 attached to the first face 14 of the semi-finished optical element 11 and a second face 18, opposite to the first face 17, to which is attached the blocking device 13.

The removable overlay 12 further comprises a lateral surface 22 extending from one to the other of the first face 17 and second face 18.

The removable overlay 12 extends on the entire surface of the first face 14 and has its lateral surface 22 in register with the lateral surface 16 of the semi-finished optical element 11.

As explained in more details below, the removable overlay 12 has been molded on the first face 14 of the semi-finished optical element 11 and its first face 17 has therefore the same shape as the first face 14 of the semi-finished optical element 11.

The second face 18 of the removable overlay 12 is aligned with the reference mark 77 of the semi-finished optical element 11.

In other words, the second face 18 of the removable overlay 12 is positioned in a predetermined manner with respect to the reference mark 77.

As explained below, this is obtained by positioning a molding device 56 (FIGS. 5 to 7) for molding the removable overlay 12 in the same manner as the blocking device 13 is positioned with respect to the reference mark 77.

For instance, the alignment of the second face 18 of the removable overlay 12 with the reference mark 77 is carried out by positioning the second face 18 so that its axis of symmetry intersects the center of the reference mark 77.

For enhancing the adherence of the removable overlay 12 on the first face 14 of the semi-finished optical element 11 while ensuring that the removable overlay 12 can be removed from the optical element 11, an adhesive film 20 is interposed between the first face 14 of the semi-finished optical element 11 and the first face 17 of the removable overlay 12.

The blocking device 13 is generally cylindrical in shape and has a contact face 19 having a predetermined axisymmetric shape, here spherical. The blocking device 13 is here a vacuum blocking device configured for enabling a vacuum-based retaining effect at the contact face 19 so as to hold an element having against the contact face 19 a surface of the same shape as the contact face 19.

As explained in more details below, the removable overlay 12 has been molded such that its second face 18 has the same shape as the contact face 19 and can therefore be attached to the contact face 19 through the vacuum-based retaining effect.

The contact face 19 of the blocking device 13 is directly attached to the second face 18 of the removable overlay 12 and consequently attached to the first face 14 of the semi-finished optical element 11 via the removable overlay 12.

It is to be noted that here the shape of the first face 14 is different from the shape of the contact face 19. Because of the difference of shape, the contact face 19 of the blocking device 13 could not be directly attached to the first face 14 of the optical element 11.

Here, the first face 14 and the contact face 19 are spherical and the radius of curvature of the first face 14 is greater than the radius of curvature of the contact face 19. Consequently, the removable overlay 12 has a variable thickness which is greater at the center and reduces towards the lateral surface 22.

In other configurations, the first face 14 is not spherical, for instance for providing progressive and/or prism properties to the ophthalmic lens forming here the optical element.

It should be noted that in the configuration of the subset 10 shown on FIGS. 1 and 2, the contact face 19 of the blocking device 13 is aligned with the reference mark 77 of the semi-finished optical element 11.

In other words, the contact face 19 of the blocking device 13 is positioned in a predetermined manner with respect to the reference mark 77.

For instance, the alignment of the contact face 19 of the blocking device 13 with the reference mark 77 is carried out by positioning the contact face 19 so that its axis of symmetry intersects the center of the reference mark 77.

Since the second face 18 of the removable overlay 12 is also aligned with the reference mark 77, the contact face 19 of the blocking device 13 is aligned with the second face 18 of the removable overlay 12.

The optical element 11 has here a larger diameter than the blocking device 13 and the contact face 19 of the blocking device 13 is in contact with only a central portion 23 of the removable overlay 12.

A peripheral portion 24 of the removable overlay 12, extending from the central portion 23 up to the lateral surface 22, is therefore free of contact with the blocking device 13.

During the surfacing operation of the second face 15 by the surfacing apparatus, the optical element 11 is thus maintained by the blocking device 13 only through the central portion 23.

The blocking device 13, together with the removable overlay 12, offers a stiff support to the optical element 11.

In particular, this support prevents the optical element 11 from excessive vibrations during the surfacing operation.

It is to be noted that the portion of the optical element 11 which is in line with the peripheral portion 24, and in particular the edge portion of the optical element 11, is supported by the peripheral portion 24 of the removable overlay 12 which is not in turn supported by the blocking device 13.

The peripheral portion 24 is configured to add stiffness to the stiffness of the optical element 11 at the edge to prevent it from excessive vibrations during the surfacing operation.

This is of particular interest with optical elements having a relatively thin edge.

The blocking device 13 will now be described in details with reference to FIGS. 2 and 3.

The blocking device 13 comprises a rigid cylindrical base 21 having on one side a concave support face 26, and a flexible non-skid wafer 25 covering at least the support face 26 of the rigid cylindrical base 21 and forming the contact face 19 on the side opposite to the support face 26.

The base 21 comprises an attachment portion 27 comprising the support face 26 and configured to be at least partially covered by the wafer 25, and a mounting portion 28 opposite to the support face 26 and configured to be mounted on a holder 72 (FIG. 8) of an equipment 69 that can be used for coupling the blocking device 13 and an element having a surface of the same shape as the contact face 19.

Here such an element is the optical element 11 and when coupled with the optical element 11, the blocking device 13 holds the optical element 11 with the contact face 19 of the blocking device 13 directly attached to the second face 18 of the removable overlay 12, as shown on FIGS. 1 and 2.

The attachment portion 27 and the mounting portion 28 are each generally cylindrical and coaxially arranged.

The attachment portion 27 is larger than the mounting portion 28 and the base 21 comprises a shoulder 29 at the junction between the attachment portion 27 and the mounting portion 28.

The attachment portion 27 further comprises a lateral surface 30 extending from one to the other of the shoulder 29 and the support face 26.

The lateral surface 30 is formed at the outer edge of the attachment portion 27.

The base 21 further comprises a plurality of concentrically disposed annular grooves 31, here three, formed in the attachment portion 27, on the side of the support face 26.

More precisely, the base 21 comprises an inner groove 32 formed near the centre of the support face 26, an outer groove 34 formed near the lateral surface 30 and an intermediate groove 33 formed between the inner groove 32 and the outer groove 34.

The intermediate groove 33 is equally spaced apart from the inner groove 32 and the outer groove 34.

Each groove 32, 33 and 34 comprises two opposite lateral surfaces 35 and a bottom surface 36 extending from one to the other of the lateral surfaces 35.

The bottom surfaces 36 of the grooves 32, 33 and 34 are each located at the same level.

The base 21 further comprises communication grooves formed in the attachment portion 27 and configured to enable a fluid communication between two adjacent annular grooves.

More specifically, the communication grooves comprise a first communication groove 37 radially oriented and extending from the outer lateral surface 35 of the inner groove 32 up to the inner lateral surface 35 of the intermediate groove 33 so as to enable a fluid communication between the inner groove 32 and the intermediate groove 33.

The communication grooves further comprise a second communication groove 38 radially oriented and extending from the outer lateral surface 35 of the intermediate groove 33 up to the inner lateral surface 35 of the outer groove 34 so as to enable a fluid communication between the intermediate groove 33 and the outer groove 34.

It is to be noted that the intermediate groove 33 is in fluidic communication with both the inner groove 32 and the outer groove 34, the inner and outer grooves 32 and 34 being therefore in fluidic communication through the intermediate groove 33.

The base 21 further comprises an annular rib 39 (FIG. 3) formed on the support face 26 between the outer groove 34 and the lateral surface 30 of the attachment portion 27.

More precisely, the annular rib 39 is located in register with the outer lateral surface 35 of the outer groove 34.

The mounting portion 28 of the cylindrical base 21 comprises a cylindrical skirt 40 jutting from the attachment portion 27 on the side opposite to the support face 26.

The cylindrical skirt 40 comprises a straight proximal portion 41 and a frustoconical distal portion 42 extending the proximal portion 41.

The mounting portion 28 further comprises an internal cylindrical space 43 formed partially in the distal portion 42 and partially in the proximal portion 41, and opening through a back face 44 of the cylindrical base 21 located opposite to the support face 26.

The cylindrical skirt 40 further comprises a plurality of notches 45 formed in the back face 44 and extending radially through the distal portion 42, opening into the internal space 43 and through an outer lateral surface 46 of the skirt 40.

The notches 45 form a first indexing member configured to cooperate by form-fitting with a corresponding first indexing member 80 (FIG. 8) formed on the holder 72 onto which the blocking device 13 is to be mounted, so that the blocking device 13 is in a predetermined position with respect to the holder 72 when it is mounted thereon.

In particular, these first indexing members 45 and 80 are configured to determine the orientation of the blocking device 13 with respect to the holder 72.

The shoulder 29 forms a second indexing member configured to cooperate with a corresponding second indexing member 81 formed on the holder 72 onto which the blocking device 13 is to be mounted, so that the blocking device 13 is in a predetermined position with respect to the holder 72 when it is mounted thereon.

In particular, these second indexing members 29 and 81 are configured to determine the position of the contact face 19 with respect to the holder 72.

The cylindrical base 21 further comprises a central through pipe 47 extending axially into the proximal portion 41 of the skirt 40 and into the attachment portion 27.

The pipe 47 opens into the internal space 43 at a first end 48 and opens through the support face 26 at a second end 49, opposite to the first end 48, so as to enable a fluid communication between the internal space 43 and the region of space which is in the immediate vicinity of the support face 26.

The wafer 25 is in the shape of a disc having a first main face 53, a second main face 54 opposite to the first main face 53 and a lateral face 55 extending from one to the other of the first and second main faces 53 and 54.

The wafer 25 is made of a flexible material having non-skid properties.

The wafer 25 is applied on the cylindrical base 21 with an inner portion 51 of the wafer 25 covering entirely the support face 26 and an outer annular portion 52 of the wafer 25 at least partially covering the lateral surface 30.

The first main face 53 here forms the contact face 19 of the blocking device 13 when the blocking device is assembled.

The wafer 25 has a plurality of through holes 50 formed in the inner portion 51 and extending from one to the other of the main faces 53 and 54.

The plurality of through holes 50 comprises six series of three radially aligned holes 50 and a central hole 50 aligned with each of the series of three holes 50.

The series of three holes are angularly spaced apart in a regular manner, two successive series defining an angle of 60°.

The wafer 25 is configured so that each hole 50 of a series of three holes 50 comes in register with and opens into a respective annular groove 32, 33 and 34 of the attachment portion 27; and is configured so that the central hole 50 comes in register with the second end 49 of the pipe 47.

The holes 50 are configured to enable a fluidic communication between the region of space which is in the immediate vicinity of the contact face 19 and a respective of the annular grooves 32, 33 and 34 and pipe 47.

For enabling the vacuum-retaining effect between the contact face 19 and the face 18 of the removable overlay 12, the subset 10 is placed in a vacuum chamber. Because of the tight contact between face 18 and face 19, the vacuum is preserved when the assembly is taken out of the vacuum chamber.

In an alternative embodiment, the vacuum retaining effect is enabled by sucking, for instance with a modified base 21 in which there is a fluid communication between pipe 47 and annular groove 32; air being sucked through pipe 47.

Figure 3:
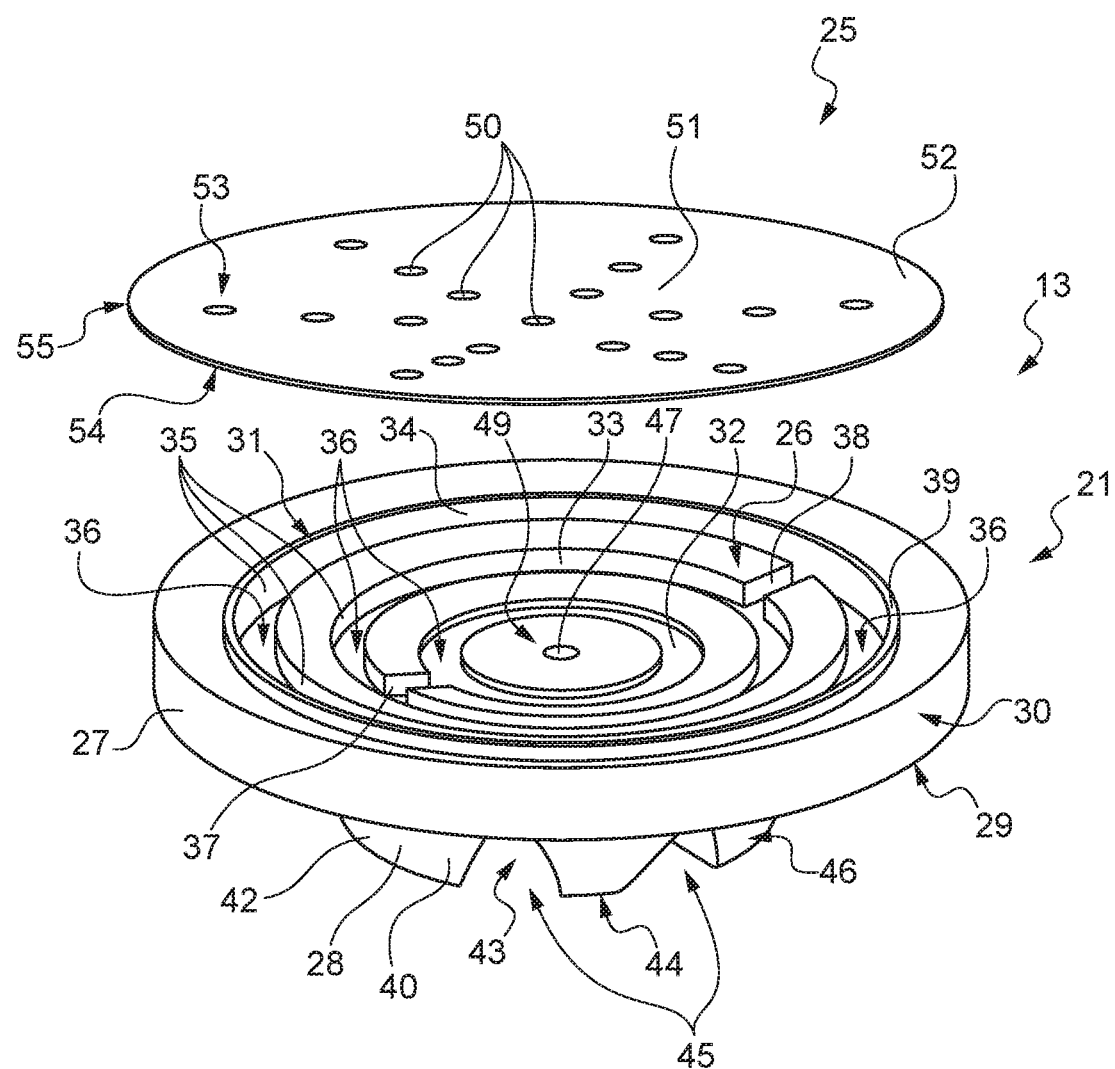
FIG. 3 is an exploded view of the blocking device alone.

It should be noted that the blocking device 13 illustrated on FIG. 3 is slightly different from the blocking device 13 illustrated on FIGS. 1 and 2. One difference is in the way the non-skid wafer 25 is maintained laterally on the base 21: thanks to the outer annular portion 52 in the version of FIGS. 1 and 2 and thanks to the annular rib 39 in the version of FIG. 3.

Figure 8:
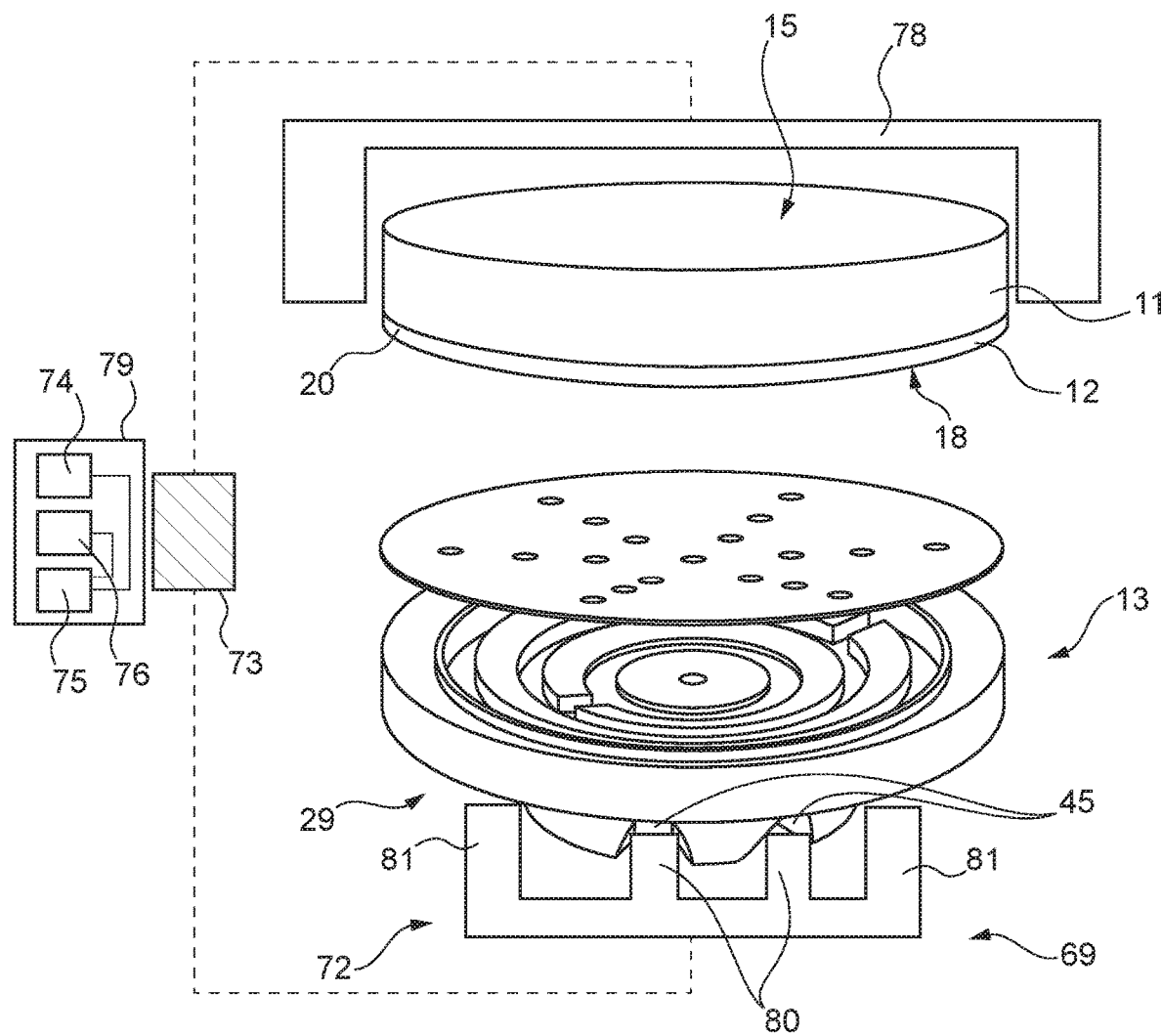
FIG. 8 is a view similar to FIG. 7 but with a third holder shown holding the blocking device and the molding device not shown.

It should also be noted that for illustration purposes the blocking device 13 is shown in exploded view on FIG. 8, but of course in use the blocking device 13 is assembled as shown on FIGS. 1 and 2.

The manufacturing of the removable overlay 12 of rigid material overlaying the first optical face 14 of the semi-finished optical element 11 will now be described with reference to FIGS. 4 to 7.

The removable overlay 12 is cast between the molding device 56 and the optical element 11.

More precisely, the removable overlay 12 is cast between the first face 14 of the optical element 11 and a concave molding face 57 of the molding device 56.

It should be noted that the molding device 56 is distinct from the blocking device 13. Consequently, the casting of the removable overlay 12 is carried out independently of the blocking device 13 and the coupling of the blocking device 13 to the semi-finished optical element 11 is carried out after the casting of the removable overlay 12.

The molding device 56 is a generally cylindrical rigid block, here made of aluminum, which comprises a molding portion 58 comprising the molding face 57 and a mounting portion 59 opposite to the molding face 57 and configured to be mounted on a holder 71 of the equipment 69.

The molding portion 58 and the mounting portion 59 are each generally cylindrical and coaxially arranged.

The molding portion 58 is larger than the mounting portion 59 and the molding device 56 comprises a shoulder 60 at the junction between the molding portion 58 and the mounting portion 59.

The molding portion 58 further comprises a lateral surface 61 extending from one to the other of the shoulder 60 and the molding face 57.

The lateral surface 61 is formed at the outer edge of the molding portion 58.

The molding face 57 has a predetermined axisymmetric shape, here spherical, which is the same axisymmetric shape as the contact face 19 of the blocking device 13.

In particular, the molding face 57 and the contact face 19 have the same radius of curvature.

It is understood that in the present memorandum, a reference to the same shape for two faces does not take into account the concave or convex nature of the faces in questions.

For instance, convex face 18 has the same shape as concave face 19; and concave shape 57 has the same shape as concave shape 19.

The mounting portion 59 of the molding device 56 comprises a cylindrical skirt 62 jutting from the molding portion 58 on the side opposite to the molding face 57.

The cylindrical skirt 62 comprises a straight proximal portion 63 and a frustoconical distal portion 64 extending the proximal portion 63.

The mounting portion 59 further comprises an internal cylindrical space 65 formed partially in the distal portion 64 and partially in the proximal portion 63, and opening through a back face 66 of the molding device 56 located opposite to the molding face 57.

The cylindrical skirt 62 further comprises a plurality of notches 67 formed in the back face 66 and extending radially through the distal portion 64, opening into the internal space 65 and through an outer lateral surface 68 of the skirt 62.

The notches 67 form a first indexing member configured to cooperate by form-fitting with a corresponding first indexing member 82 formed on the holder 71 onto which the molding device 56 is to be mounted, so that the molding device 56 is in a predetermined position with respect to the holder 71 when it is mounted thereon.

In particular, these first indexing members 67 and 82 are configured to determine the orientation of the molding device 56 with respect to the holder 71.

The shoulder 60 forms a second indexing member configured to cooperate with a corresponding second indexing member 83 formed on the holder 71 onto which the molding device 56 is to be mounted, so that the molding device 56 is in a predetermined position with respect to the holder 71 when it is mounted thereon.

In particular, these second indexing members 60 and 83 are configured to determine the position of the molding face 57 with respect to the holder 71.

It is to be noted that the respective mounting portions 28 and 59 of the blocking device 13 and the molding device 56 are similar and could be mounted onto holders of similar configuration.

The equipment 69 is configured for carrying out the casting of the removable overlay 12 and the coupling between the blocking device 13 and the optical element 11 provided with the removable overlay 12.

The equipment 69 includes accordingly a holder 78 configured for holding the optical element 11.

Figure 5:
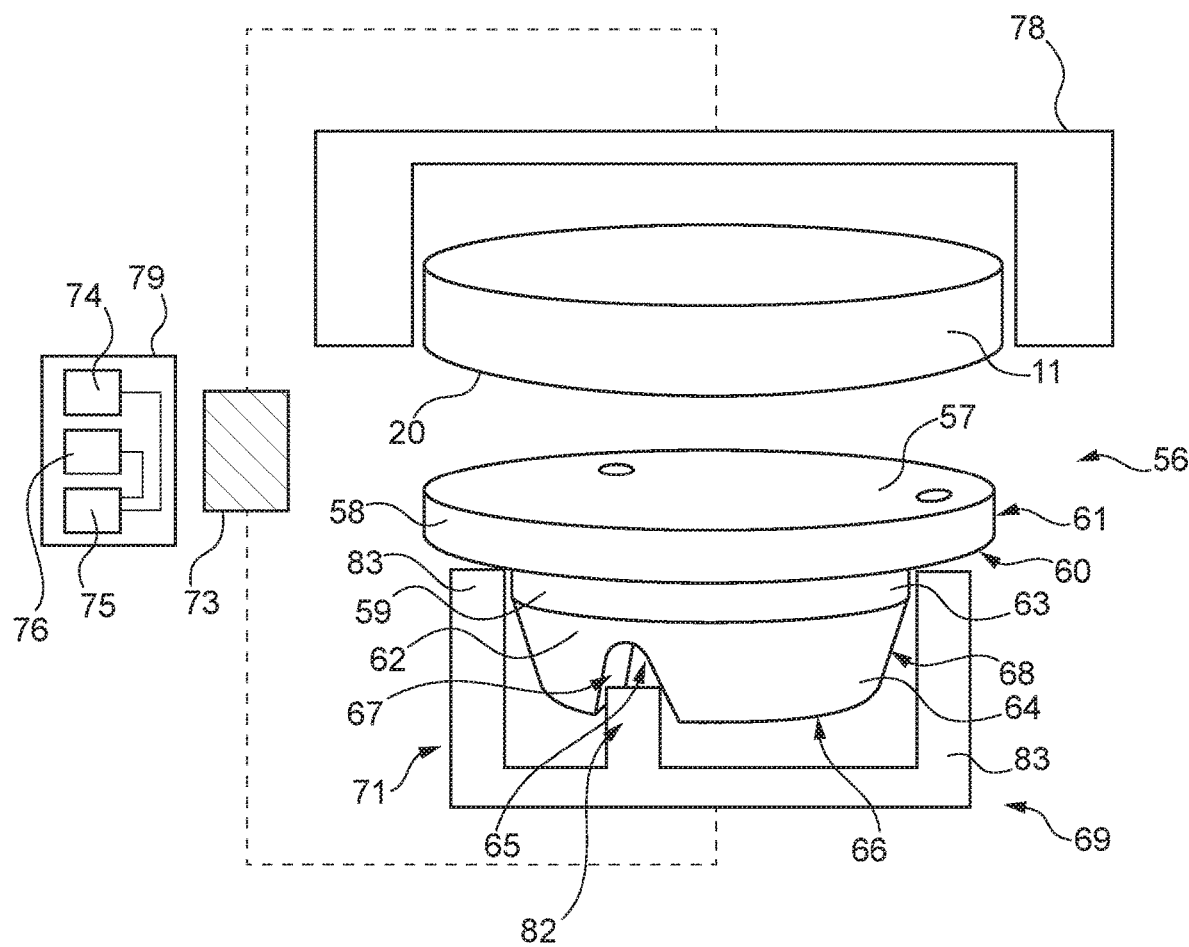
FIG. 5 illustrates schematically the optical element, a molding device of the set according to the invention and an equipment including a first holder holding the molding device and a second holder holding the optical element.

In the equipment 69, the holder 71 is mechanically connected to a reference frame 73 as shown schematically on FIG. 5 by a dashed line. The holder 72 is also mechanically connected to the reference frame 73, as shown schematically on FIG. 8 by a dashed line. The holder 78 is also mechanically connected to the reference frame 73, as shown schematically on FIGS. 5 and 8 by a dashed line.

The mechanical connection between the holder 71 and the reference frame 73 is such that the position of the holder 71 with respect to the reference frame 73 is determinable. Since the holder 71 and the molding device 56 are configured such that when the molding device 56 is held by the holder 71, the molding device 56 is positioned in a predetermined manner relative to the holder 71, the position of the molding device 56 relative to the reference frame 73 is determinable. In particular, the position of the molding face 57 with respect to the reference frame 73 is determinable.

The mechanical connection between the holder 72 and the reference frame 73 is such that the position of the holder 72 with respect to the reference frame 73 is determinable. Since the holder 72 and the blocking device 13 are configured such that when the blocking device 13 is held by the holder 72, the blocking device 13 is positioned in a predetermined manner relative to the holder 72, the position of the blocking device 13 relative to the reference frame 73 is determinable. In particular, the position of the contact face 19 with respect to the reference frame 73 is determinable.

The mechanical connection between the holder 78 and the reference frame 73 is such that the position of the holder 78 with respect to the reference frame 73 is determinable.

The mechanical connection between the holder 78 and the reference frame 73 includes a driving system 76 for driving the holder 78 with respect to the reference frame 73.

For determining the current position with respect to the reference frame 73 of the optical element 11 held by the holder 78, the equipment 69 includes a camera 74.

The driving system 76 and the camera 74 are each connected to a control unit 75.

The driving system 76, the camera 74 and the control unit 75 are included in a positioning system 79 configured for positioning the semi-finished optical element 11 with respect to the reference frame 73.

The camera 74 is configured to capture images of the first face 14 of the optical element 11.

The control unit 75 is configured for detecting on the captured images the reference mark 77 and for determining the current position of the reference mark 77 with respect to the reference frame 73.

Since the position of the molding device 56 with respect to the reference frame 73 is determinable, the control unit 75 can determine the current position of the reference mark 77 with respect to the molding device 56.

The control unit 75 is configured for controlling the driving system 76 so as to position the optical element 11 and the molding device 56 in an expected relative position in which the molding face 57 is aligned with the reference mark 77.

Figure 4:
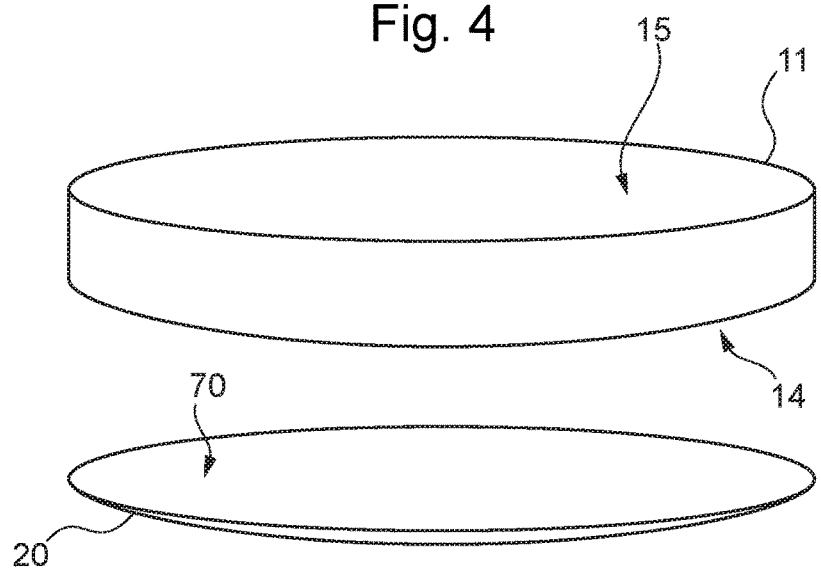
FIG. 4 shows the optical element and an adhesive film regarding a first face of the optical element onto which the adhesive film is to be applied.

Before the casting of the removable overlay 12 on the optical element 11, the adhesive film 20 is applied onto the first face 14 of the optical element 11, as shown on FIG. 4.

The adhesive film 20 has an adhesive face 70 attached to the first face 14 of the semi-finished optical element 11.

The adhesive film 20 is here applied on the entire surface of the first face 14.

The optical element 11 is mounted onto the third holder 78.

The molding device 56 is mounted onto the holder 71.

The control unit 75 determines the current position of the optical element 11, and more precisely of the reference mark 77, and drives the optical element 11 towards a pre-expected position of the optical element 11 with respect to the molding device 56 in which the optical element 11 is at a distance from the molding device 56.

The control unit 75 is further configured for controlling the driving system 76 so as to drive the optical element 11 from the pre-expected position towards the expected position with respect to the molding device 56 by bringing closer to one another the optical element 11 and the molding device 56.

The material from which the removable overlay is made has a conformable state above ambient temperature and a rigid state at ambient temperature.

Such a material is here a thermoplastic, for instance a polyester having a melting temperature of about 60° C.

It is to be noted that this material can withstand several heating/melting and cooling/solidifying cycles and is therefore re-usable.

Figure 6:
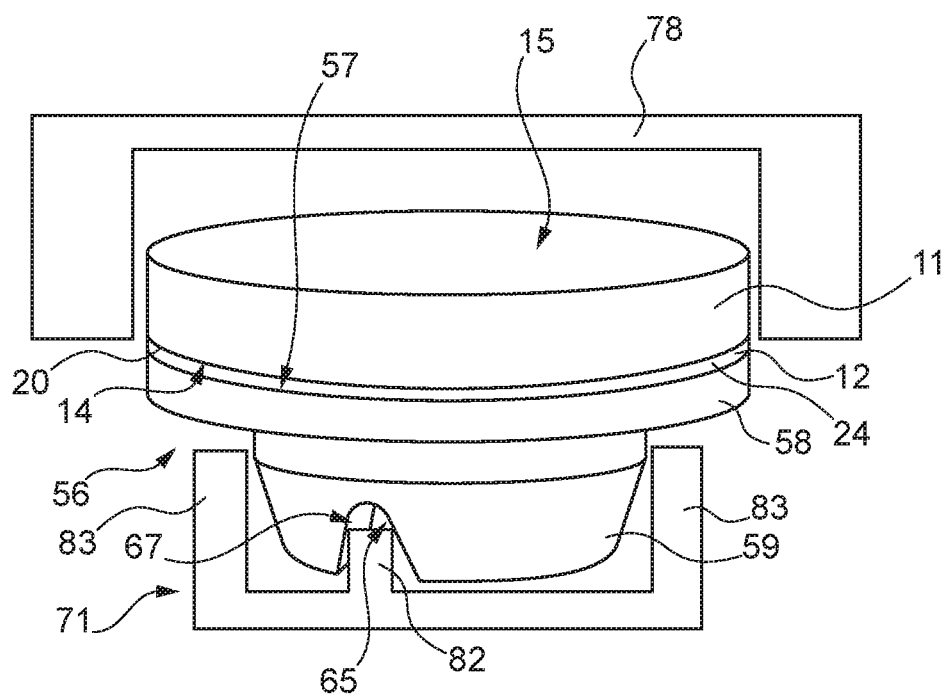
FIG. 6 is a view similar to FIG. 5 but with the optical element and the molding device in an expected relative position and the removable overlay casted between the molding device and the optical element.

The removable overlay 12 is obtained by casting the material which has been previously warmed to reach its conformable state between the first face 14 of the optical element 11 and the molding face 57 of the molding device 56 (FIG. 6).

More precisely, the material is warmed to reach a viscous state and in the pre-expected position a predetermined amount of material in the form of a nut is placed by a nozzle onto the molding face 57 of the molding device 56.

The optical element 11 and the molding device 56 are then brought closer to one another until the optical element 11 reaches the expected position.

During this step, the material is spread between the first face 14 of the optical element 11 and the molding face 57 of the molding device 56, so as to form the removable overlay.

The removable overlay is then left to cool so as to become rigid.

Figure 7:
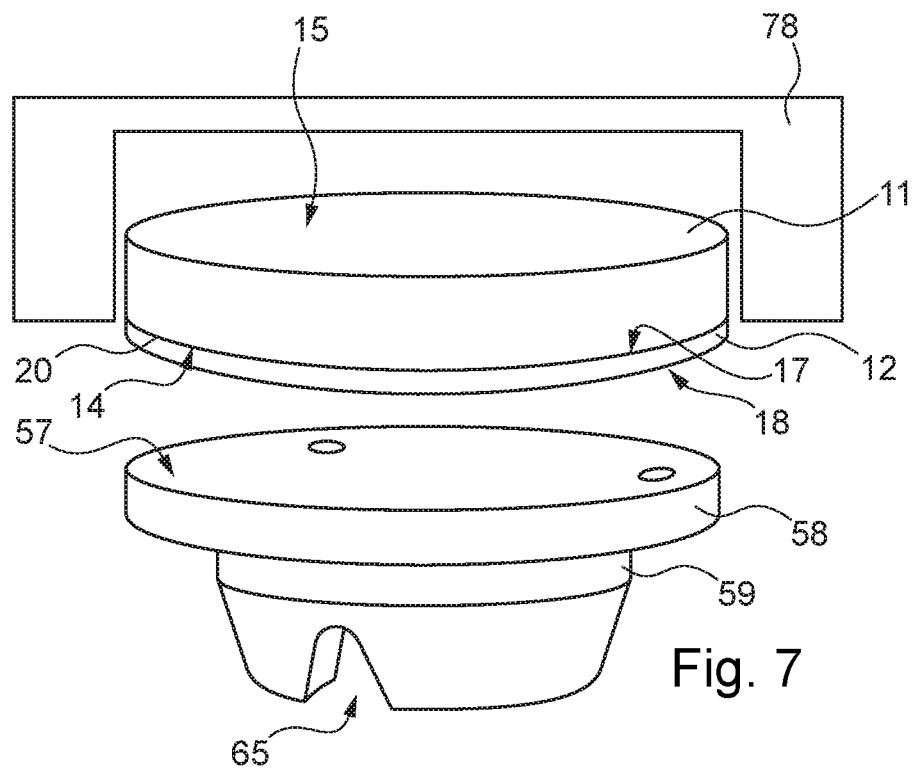
FIG. 7 is a view similar to FIG. 6 but with the molding device away from the removable overlay and the first holder not shown.

After the removable overlay 12 has cooled and is sufficiently rigid to retain its shape, the molding device 56 is removed while leaving the removable overlay 12 attached to the first face 14 of the semi-finished optical device 11 (FIG. 7).

It will be noted that the respective materials of which are made the molding device 56 and the removable overlay 12, respectively aluminum and polyester, permit to have a relatively low adhesion force between the molding surface 57 and the second face 18 of the removable overlay 12, which can therefore be separated easily so as to avoid undesired detachment of the removable overlay 12 from the optical element 11.

The adhesive film 20 which enhances the adhesion between the first face 17 of the removable overlay 12 and the first face 14 of the semi-finished optical element 11, further permits to avoid such detachment.

As mentioned above, in the expected position the molding face 57 is aligned with the reference mark 77 of the semi-finished optical element 11. Thus, the second face 18 of the removable overlay 12 is aligned with the reference mark 77 of the semi-finished optical element 11.

It is to be noted also that the expected position determines the final configuration of the removable overlay 12, in particular its thickness.

As explained above, the thickness of the removable overlay 12, in particular in its peripheral portion 24, has an influence on the stiffness of the optical element 11 at the edge and the removable overlay 12 can therefore be configured to prevent the optical element 11 from excessive vibrations during the subsequent surfacing operation.

It will be noted that the rigidity of the material of the removable overlay 12 is another parameter on which depends the stiffness of the peripheral portion 24, further to its thickness.

In preferred embodiments, the material has an elastic modulus E of at least 100 MPa.

After the step of removing the molding device 56, the blocking device 13 is mounted onto the holder 72.

The driving system 76 then drives the optical element 11 towards the blocking device 13 until the contact face 19 of the blocking device 13 is in contact with the second face 18 of said removable overlay 12 and is aligned with the reference mark 77 of the semi-finished optical element 11.

In this position, the contact face 19 of the blocking device 13 is aligned with the second face 18 of the removable overlay 12.

This is carried out in a similar fashion as the driving towards the expected relative position between the optical element 11 and the molding device 56 because the position of the contact face 19 is determinable in a similar fashion as the position of the molding face 57.

A vacuum-based retaining effect is then enabled at the contact face 19 of the blocking device 13 so as to attach the blocking device 13 to the second face 18 of the removable overlay 12 and therefore to the optical element 11.

The subset 10 is thus in the configuration shown on FIGS. 1 and 2.

It should be noted that the set formed by the subset 10 and the molding device 56 is configured for having a first subset configuration shown on FIG. 6 in which the second face 18 of the removable overlay 12 is in molding contact with the molding face 57 of the molding device 56, then a second subset configuration shown on FIG. 7 in which the second face 18 of the removable overlay 12 is free and then a third subset configuration shown on FIGS. 1 and 2 in which the second face 18 of the removable overlay 12 is retained in contact with the contact face 19 of the blocking device.

Figure 9:
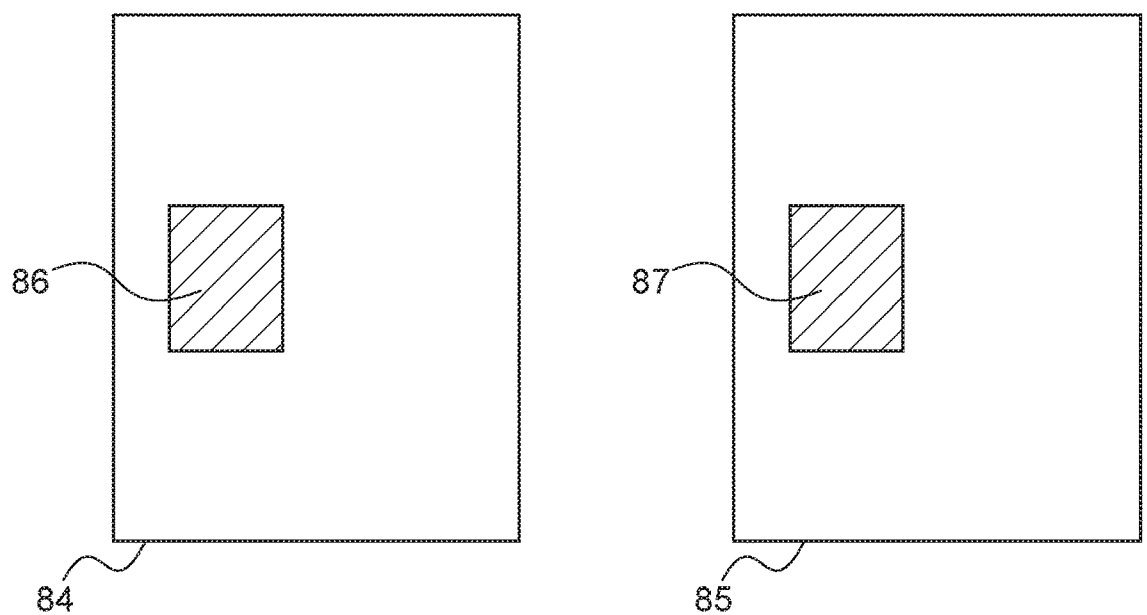
FIG. 9 illustrates schematically a variant in which the single equipment is replaced by a first equipment for casting the removable overlay and a second equipment for coupling the blocking device and the optical element overlaid with the removable overlay.

In a variant schematically illustrated on FIG. 9, the steps described above with reference to FIGS. 5 to 7 (for casting the removable overlay) and the steps described above with reference to FIG. 8 (for coupling the blocking device 13 and the optical element overlaid with the removable overlay 12) are carried out respectively in a first equipment 84 and a second equipment 85 distinct from the first equipment.

In this variant the first equipment 84 has a first reference frame 86 and the second equipment 85 has a second reference frame 87. For carrying out the casting step in the first equipment 84, the optical element 11 and the molding device 56 are positioned each with respect to the first reference frame 86 so that the molding face 57 is aligned with the reference mark 77. After the casting step, the optical element 11 overlaid with the removable overlay 12 and the blocking device 13 are positioned each with respect to the second reference frame 87 so that the contact face 19 of the blocking device 13 is in contact with the second face 18 of the removable overlay 12 and is aligned with the reference mark 77 whereby the contact face 19 of the blocking device 13 is aligned with the second face 18 of the removable overlay 12; and then a vacuum-based retaining effect is enabled at the contact face 19 of the blocking device 13.

Figure 10:
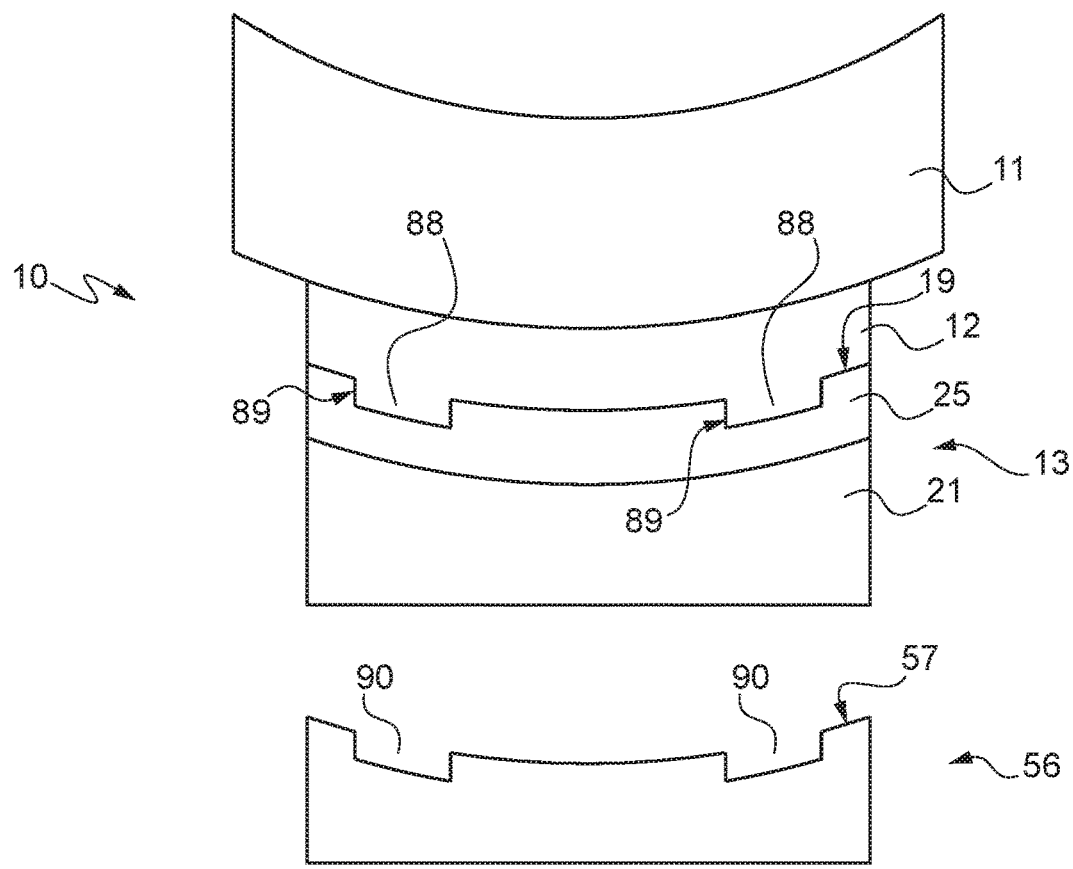
FIG. 10 illustrates schematically a variant of the set according to the invention.

In another variant schematically illustrated on FIG. 10, in which there is also a first equipment for casting the removable overlay 12 and a second equipment for coupling the blocking device 13 to the optical element 11 overlaid with the removable overlay 12, the second equipment is not configured for determining the position of the reference mark 77 and for aligning accordingly the optical device 11 overlaid with removable overlay 12. Instead, the molding device 56 includes portions 90 configured so that after the casting step the removable overlay 12 includes indexing members 88; and the blocking device 13 includes counterpart indexing members 89 positioned with respect to the contact face 19 exactly as the portions 90 of the molding device 56 that have molded the indexing members 88 of the removable overlay 12 are positioned with respect to the molding face 57; and in the second equipment the vacuum is pulled or drawn after the optical device 11 is positioned with respect to the blocking device 13 by the indexing members 88 of the removable overlay 12 and the counterpart indexing members 89 of the blocking device 13, which are indeed form fit indexing members. For instance, the form fit indexing members include two male members and two female members.

In variants that are not illustrated:
  instead of being a removable part, the blocking device 13 is permanently included in the surfacing machine;
  the retaining effect at the contact face 19 is not vacuum-based, for instance another reversibly controllable effect such as electrostatic or electromagnetic based or for instance a glue-based effect;

the semi-finished optical element 11 is different from a semi-finished ophthalmic lens, for instance a lens for an optical instrument;

instead of having as in the drawn embodiment the first optical face of the semi-finished optical element which is convex and the first face of the removable overlay which is concave, the curvatures are inverted, i.e. the first optical face of the semi-finished optical element is concave and the first face of the removable overlay is convex;

the first optical face of the optical element and the contact face of the blocking device have the same shape;

the optical element and the blocking device have the same diameter, and the contact face of the blocking device is in contact with the entire second face of the removable overlay;

instead of having the holder of the molding device and/or the holder of the blocking device not driven, the holder of the molding device and/or the holder of the blocking device is (are) driven; and/or the holder of the optical element is not driven;

instead of having its face 17 attached to the face 14 of the element 11 through the film 20, the removable overlay 12 has its face 17 directly attached to the face 14 of the element 11;

the removable overlay material is not a thermoplastic material but is a fusible alloy and the casting step includes warming the fusible alloy to bring it to a molten state and casting the molten alloy into a cavity of the molding device axially delimited by the molding face and laterally delimited by a portion of the molding device;

the removable overlay material is not configured for being brought to its rigid state by cooling the temperature but is rather configured for being polymerized by light irradiation, for example UV irradiation; and/or the removable overlay material is not re-usable.

It should be noted more generally that the invention is not limited to the examples described and represented.

The invention claimed is:

1. A set comprising:
a semi-finished optical element having a first face and a second face opposite to the first face, the second face configured to be surfaced in a machine configured to hold the semi-finished optical element;
a blocking device attached to the first face of the semi-finished optical element, the second face of the semi-finished optical element being configured to be surfaced in a machine configured to hold the semi-finished optical element via the blocking device, the blocking device having a contact face having a predetermined axisymmetric shape and being configured to enable a retaining effect at the contact face to hold an element having, against the contact face, a surface of a same shape as the contact face;
a molding device having a molding face having the same shape as the contact face of the blocking device; and
a removable overlay of rigid material having a first face attached to the first face of the semi-finished optical element and a second face opposite to the first face of the removable overlay having the same shape as the contact face of the blocking device,
wherein said set is configured to have:
a first subset configuration in which the second face of the removable overlay is in molding contact with the molding face of the molding device,
a second subset configuration in which the second face of the removable overlay is free, and
a third subset configuration in which the second face of the removable overlay is retained in contact with the contact face of the blocking device.

2. The set according to claim 1, wherein the second face of the removable overlay is aligned with a reference mark of the semi-finished optical element.

3. The set according to claim 2, wherein, in the third subset configuration, the contact face of the blocking device is aligned with the second face of the removable overlay.

4. The set according to claim 1, wherein the predetermined axisymmetric shape of the contact face is a spherical shape.

5. The set according to claim 1, wherein the removable overlay includes indexing members and the blocking device includes counterpart indexing members, the indexing members and the counterpart indexing members being form fit indexing members.

6. The set according to claim 5, wherein said form fit indexing members include two male members and two female members.

7. The set according to claim 1, further comprising an adhesive film interposed between the semi-finished optical element and the removable overlay, said adhesive film having an adhesive face attached to the first face of the semi-finished optical element.

8. The set according to claim 1, wherein said retaining effect is vacuum-based, and
the blocking device includes a rigid part and a flexible non-skid wafer covering said rigid part on one side and forming said contact face on the side opposite to said one side.

9. The set according to claim 1, wherein the semi-finished optical element is a semi-finished ophthalmic lens.

10. A method for providing the set according to claim 1, the method comprising:
providing the blocking device having the contact face having a predetermined axisymmetric shape and configured for to enable the retaining effect at the contact face to hold the semi-finished optical element having, against the contact face, the surface of the same shape as the contact face;
providing the semi-finished optical element having the first face to which the blocking device is to be attached and having the second face opposite to the first face, the second face configured to be surfaced in the machine configured to hold the semi-finished optical element via the blocking device;
providing the molding device having the molding face having the same shape as the contact face of the blocking device;
casting the removable overlay of rigid material between the first face of said semi-finished optical element and the molding face of said molding device, said removable overlay having the first face attached to the first face of the semi finished optical element and the second face opposite to the first face having the same shape as the contact face of the blocking device;
retaining the second face of the removable overlay in contact with the contact face of the blocking device; and
removing said molding device while leaving said removable overlay attached to the first face of the semi-finished optical element.

17

11. The method according to claim 10, wherein said removable overlay is made of a material having a conformable state above ambient temperature and a rigid state at ambient temperature, and said method further comprises warming said material to reach said conformable state and casting said removable overlay in said conformable state and leaving said removable overlay to cool and to become rigid.

12. The method according to claim 11, wherein said material is a thermoplastic material.

13. The method according to claim 10, further comprising:

providing a first equipment having a first reference frame;

positioning said semi-finished optical element and said molding device each with respect to said first reference frame so that said molding face is aligned with a reference mark of the semi-finished optical element, during the casting the removable overlay;

removing the molding device and positioning said blocking device with respect to said first reference frame so that said contact face of said blocking device is in contact with said second face of said removable overlay and is aligned with said reference mark of the semi-finished optical element whereby said contact face of said blocking device is aligned with said second face of said removable overlay, after the casting the removable overlay; and enabling said retaining effect at said contact face of said blocking device.

14. The method according to claim 10, further comprising:

providing a first equipment having a first reference frame;

providing a second equipment having a second reference frame, distinct from said first equipment;

positioning said semi-finished optical element and said molding device each with respect to said first reference frame so that said molding face is aligned with a reference mark of the semi-finished optical element, during the casting the removable overlay; and positioning said semi-finished optical element overlaid with said removable overlay and said blocking device each with respect to said second reference frame so that said contact face of said blocking device is in contact with said second face of said removable overlay and is aligned with said reference mark of the semi-finished optical element whereby said contact face of said blocking device is aligned with said second face of said removable overlay, after the casting the removable overlay; and enabling said retaining effect at said contact face of said blocking device.

15. The method according to claim 13, wherein the molding device includes a first indexing member and the first equipment includes a corresponding first indexing member, the first indexing member and the corresponding first indexing member being form fit indexing members configured to position said molding device with respect to said first reference frame, and said first equipment includes a positioning system configured for positioning to position said semi-finished optical element with respect to said first reference frame, said positioning system including a camera configured to determined a current position of said semi-finished optical element.

16. The set according to claim 2, wherein the predetermined axisymmetric shape of the contact face is a spherical shape.

17. The set according to claim 3, wherein the predetermined axisymmetric shape of the contact face is a spherical shape.

18. The set according to claim 2, wherein the removable overlay includes indexing members and the blocking device includes counterpart indexing members, the indexing members and the counterpart indexing members being form fit indexing members.

19. The set according to claim 3, wherein the removable overlay includes indexing members and the blocking device includes counterpart indexing members, the indexing members and the counterpart indexing members being form fit indexing members.

20. The set according to claim 4, wherein the removable overlay includes indexing members and the blocking device includes counterpart indexing members, the indexing members and the counterpart indexing members being form fit indexing members.

\* \* \* \* \*